US012738866B2

(12) United States Patent
Chen et al.

(10) Patent No.: US 12,738,866 B2
(45) Date of Patent: Sep. 15, 2026

(54) MICRO INVERTER

(71) Applicant: Sungrow Power Supply Co., Ltd., Hefei (CN)

(72) Inventors: Qiaodi Chen, Hefei (CN); Jiacai Zhuang, Hefei (CN); Jun Xu, Hefei (CN)

(73) Assignee: Sungrow Power Supply Co., Ltd., Hefei (CN)

(*) Notice: Subject to any disclaimer, the term of this patent is extended or adjusted under 35 U.S.C. 154(b) by 180 days.

(21) Appl. No.: 18/715,066

(22) PCT Filed: Dec. 30, 2022

(86) PCT No.: PCT/CN2022/144048

§ 371 (c)(1),
(2) Date: May 30, 2024

(87) PCT Pub. No.: WO2023/165253

PCT Pub. Date: Sep. 7, 2023

(65) Prior Publication Data

US 2025/0030356 A1 Jan. 23, 2025

(30) Foreign Application Priority Data

Mar. 4, 2022 (CN) ........................ 202210211767.3

(51) Int. Cl.

*H02M 7/5387* (2007.01)
*H02M 1/00* (2006.01)
*H02M 1/32* (2007.01)

(52) U.S. Cl.

CPC ..... *H02M 7/53871* (2013.01); *H02M 1/0083* (2021.05); *H02M 1/32* (2013.01)

(58) Field of Classification Search

CPC ... H02M 7/53871; H02M 1/0083; H02M 1/32
See application file for complete search history.

(56) References Cited

U.S. PATENT DOCUMENTS 12,136,871 B2 * 11/2024 Zhang .................. H02M 1/007
12,395,096 B2 * 8/2025 Zhang .................. H02M 1/007

(Continued)

FOREIGN PATENT DOCUMENTS

CN 101847939 A 9/2010
CN 104078992 A 10/2014

(Continued)

OTHER PUBLICATIONS

First Office Action for Chinese Application No. 202210211767.3, dated Jun. 17, 2025.

(Continued)

*Primary Examiner* — Adolf D Berhane

(74) *Attorney, Agent, or Firm* — Wolf, Greenfield & Sacks, P.C.

(57) ABSTRACT

Provided in the present application is a micro inverter. In a main circuit of the micro inverter, after N conversion branches are cascaded with each other, the same transformer is shared to connect a secondary-side bridge arm, thereby avoiding the need for N transformers in the prior art; moreover, by means of cascading, the N conversion branches can realize decoupling in terms of control, thereby avoiding the need to additionally equip each branch with a device for decoupling, and thus reducing the volume and costs. In addition, each direct-current source or load can realize alternating-current grid connection only by means of one-stage conversion, and therefore, the conversion efficiency is improved compared with a two-stage conversion structure in the prior art.

11 Claims, 7 Drawing Sheets

(56) References Cited

U.S. PATENT DOCUMENTS

| | | | | |
|---|---|---|---|---|
| 12,413,159 | B2 * | 9/2025 | Wang .................. | H02M 7/5387 |
| 2010/0244575 | A1 | 9/2010 | Coccia et al. | |
| 2015/0015072 | A1 | 1/2015 | Debov et al. | |

FOREIGN PATENT DOCUMENTS

| | | | |
|---|---|---|---|
| CN | 108023497 | A | 5/2018 |
| CN | 113595431 | A | 11/2021 |
| CN | 114553043 | A | 5/2022 |
| WO | WO 2021/120354 | A1 | 6/2021 |

OTHER PUBLICATIONS

International Search Report and Written Opinion for International Application No. PCT/CN2022/144048, mailed Mar. 2, 2023.

Extended European Search Report for European Application No. 22929675.1, dated Nov. 20, 2025.

Huynh et al., Overview and Comparative Assessment of Single-Phase Power Converter Topologies of Inductive Wireless Charging Systems. Energies, May 1, 2020;13(9):2150(1-23).

* cited by examiner

MICRO INVERTER

This application is a national stage filing under 35 U.S.C. § 371 of International Patent Application Serial No. PCT/CN2022/144048, filed Dec. 30, 2022, which claims priority to Chinese Patent Application No. 202210211767.3, titled "MICRO INVERTER", filed on Mar. 4, 2022 with the China National Intellectual Property Administration. The contents of these applications are incorporated herein by reference in their entirety.

FIELD

The present disclosure relates to the technical field of power electronics, and in particular to a micro inverter.

BACKGROUND

As a micro inverter can perform maximum power point tracking (MPPT) in a module-level, power generation of photovoltaic modules will not be affected by each other. In addition, no short board effect will be caused among photovoltaic modules connected in series, so that partial occlusion and orientation inconsistency do not affect the power generation of a whole string of modules. Moreover, operation and maintenance may be implemented in a module-level with the micro inverter. Therefore, the micro inverter has received a widespread attention.

In practice, if each module is provided with an inverter, a cost per Watt of the system is high. Therefore, in order to reduce the cost per Watt of the system, a one-drive-two flyback micro inverter is provided according to the conventional technology. The topological structure of the flyback micro inverter is shown in FIG. 1, the flyback micro inverter can implement inversion and output for two photovoltaic modules PV1 and PV2, to improve a power density of the system.

However, the solution shown in FIG. 1 requires multiple high-frequency transformers, resulting in a large overall volume and a high cost. In addition, the solution relates to a two-stage conversion structure, where a flyback converter is used for increasing voltage in a first conversion stage, and an H-bridge is used for inversion in a second conversion stage. A conversion efficiency of this two-stage conversion structure is low.

SUMMARY

A micro inverter is provided according to the present disclosure, to reduce a volume and a cost, and improve conversion efficiency.

In order to implement the above objectives, the following technical solutions are provided according to the present disclosure.

A micro inverter is provided in a first aspect of the present disclosure, the micro inverter includes a control unit, a transformer, a secondary-side bridge arm and N conversion branches, where N is an integer greater than one. Each of input terminals of the conversion branches serves as an input terminal of the micro inverter and is connected to a corresponding direct-current power supply or load. Output terminals of the conversion branches are cascaded, and two terminals of the cascaded conversion branches are connected to an input terminal of the secondary-side bridge arm through the transformer. An output terminal of the secondary-side bridge arm serves as an output terminal of the micro inverter. The secondary-side bridge arm and the N conversion branches are controlled via the control unit.

In an embodiment, the transformer is a high-frequency dual-winding transformer.

In an embodiment, a primary-side winding of the transformer is connected to the two terminals of the cascaded conversion branches through a first inductor; and/or a secondary-side winding of the transformer is connected to the input terminal of the secondary-side bridge arm through a second inductor.

In an embodiment, the first inductor is independent of the primary-side winding, or the first inductor is a primary-side leakage inductor integrated in the transformer; and the second inductor is independent of the secondary-side winding, or the second inductor is a secondary-side leakage inductor integrated in the transformer.

In an embodiment, the secondary-side bridge arm includes two bidirectional switches and two output-side capacitors. The two bidirectional switches are connected in series to form a branch, the two output-side capacitors are connected in series to form another branch, and the two branches are connected in parallel to two ends of the output terminal of the secondary-side bridge arm. A connection point between the two bidirectional switches, and a connection point between the two output-side capacitors respectively serve as two ends of the input terminal of the secondary-side bridge arm.

In an embodiment, each of the bidirectional switches includes two switching transistors connected in reverse series.

In an embodiment, each of the conversion branches includes an H-bridge circuit and an input-side capacitor. Two terminals of the input-side capacitor and two ends of the H-bridge circuit at a direct-current side are connected to the two ends of the input terminal of the conversion branch; and the two terminals of the H-bridge circuit at an alternating-current side serve as two ends of the output terminals of the conversion branch.

In an embodiment, the control unit is configured to independently control the H-bridge circuits.

In an embodiment, in a case that a phase-shift angle between the H-bridge circuit and the secondary-side bridge arm is greater than zero, power in the H-bridge circuit is transmitted from the direct-current side to the alternating-current side; and in a case that the phase-shift angle between the H-bridge circuit and the secondary-side bridge arm is less than zero, the power in the H-bridge circuit is transmitted from the alternating-current side to the direct-current side.

In an embodiment, in a case that an input terminal of one of the N conversion branches is connected with no device, the control unit is configured to control two ends of the output terminal of the conversion branch to be short-circuited.

In an embodiment, in order to control the two ends of the output terminal of the conversion branch to be short-circuited, the control unit is further configured to control at least two of four switching transistors in the H-bridge circuit to be turned on.

In an embodiment, each of input terminals of the micro inverter is connected to a photovoltaic module or an energy storage device.

In an embodiment, the micro inverter further includes: a grid-side filter arranged between the output terminal of the secondary-side bridge arm and the output terminal of the micro inverter.

In the micro inverter according to the present disclosure, N conversion branches in the main circuit are cascaded, to share a same transformer to be connected to the secondary-side bridge arm, avoiding the arrangement of N transformers in the conventional technology. Moreover, the N cascaded conversion branches can implement decoupling, so that it is unnecessary to provide a device for decoupling for each branch, thereby reducing the volume and the cost. In addition, each direct-current power supply or load can be connected to an alternating-current grid via only one-stage conversion, compared with the two-stage conversion structure in the conventional technology, the loss in the conversion process is reduced and the conversion efficiency is improved according to the present disclosure.

BRIEF DESCRIPTION OF THE DRAWINGS

For clearer illustration of the technical solutions according to embodiments of the present disclosure or conventional techniques, hereinafter briefly described are the drawings to be applied in embodiments or conventional technology. Apparently, the drawings in the following descriptions are only some embodiments of the present disclosure, and other drawings may be obtained by those skilled in the art based on the provided drawings without creative efforts.

DETAILED DESCRIPTION

Technical solutions of embodiments of the present disclosure are clearly and completely described hereinafter in conjunction with the drawings of the embodiments of the present disclosure. Apparently, the embodiments described in the following are only some embodiments of the present disclosure, rather than all embodiments. Based on the embodiments in the present disclosure, all of the other embodiments which are obtained by those skilled in the art without any creative work fall within the protection scope of the present disclosure.

In the present disclosure, terms "include", "comprise" or any other variants are intended to be non-exclusive. Therefore, a process, method, article or device including a series of elements includes not only the elements but also other elements that are not enumerated, or also include elements inherent for the process, method, article or device. Unless expressively limited otherwise, a process, method, article or device limited by "comprising/including a(n) . . . " does not exclude existence of another identical element in such process, method, article or device.

A micro inverter is provided according to the present disclosure, to reduce a volume and a cost, and improve conversion efficiency.

Figure 1:
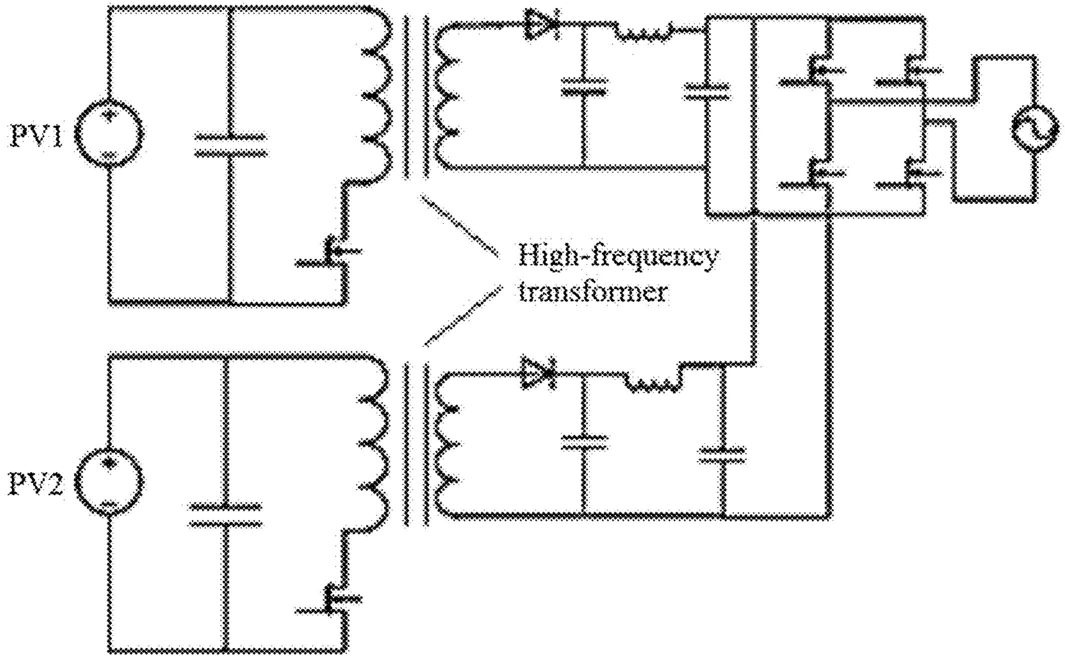
FIG. 1 a schematic structural diagram of a micro inverter according to the conventional technology.
Figure 2:
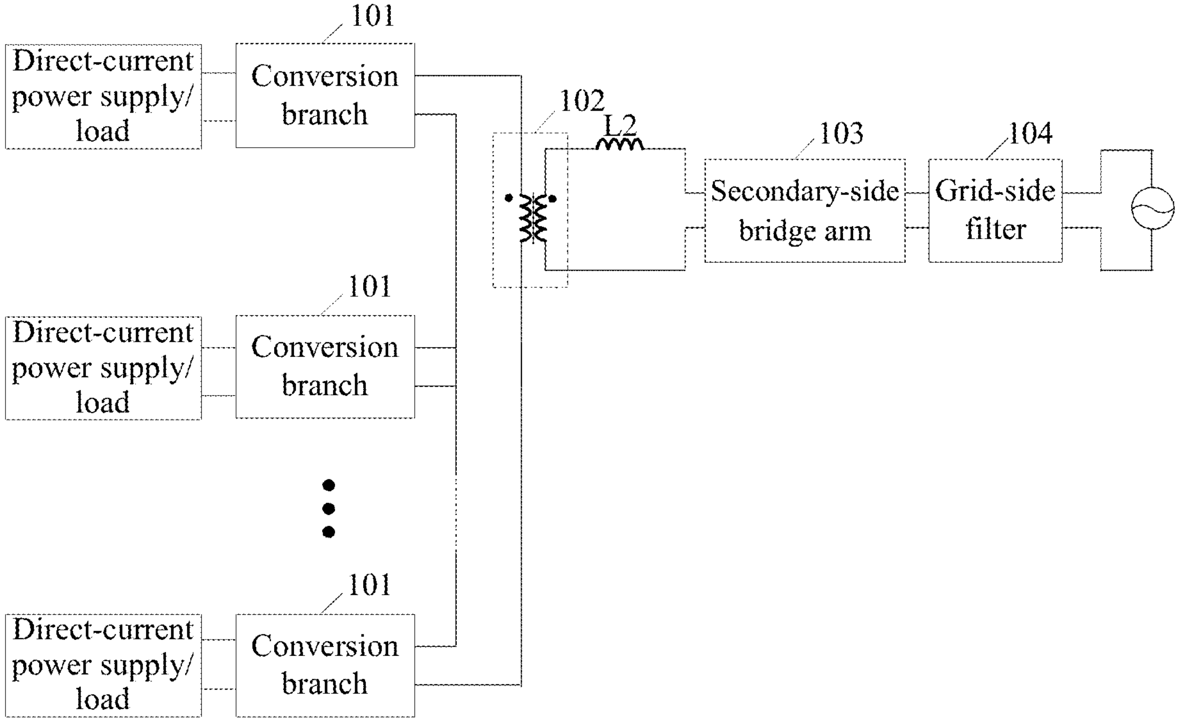
FIG. 2 is a schematic structural diagram of a micro inverter according to an embodiment of the present disclosure.

As shown in FIG. 2, the micro inverter includes a control unit (not shown in FIG. 2), a transformer 102, a secondary-side bridge arm 103 and N conversion branches 101, where N is an integer greater than one.

Each of input terminals of the N conversion branches 101 serves as an input terminal of the micro inverter and is connected to a corresponding direct-current power supply or a load. Specifically, each of the input terminals of the N conversion branches 101 may be connected to a direct-current power supply such as a photovoltaic module, or an energy storage device, such as device which can serve as either a direct-current power supply or a load, e.g. a battery. Taking the battery as an example, in a case that the battery is in a discharge state, the battery functions as a direct-current power supply, and in a case that the battery is in a charge state, the battery functions as a load. That is, the input and output terminals of the micro inverter are only explained by taking a state of being connected to the direct-current power supply as an example, and a direction of a current of the micro inverter is not limited.

Figure 3A:
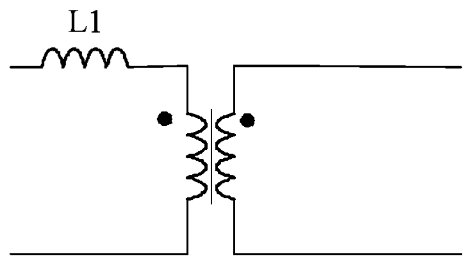
FIG. 3*a*, FIG. 3*b* and FIG. 3*c* are schematic diagrams of three setting positions of an inductor in a micro inverter according to an embodiment of the present disclosure.
Figure 3B:
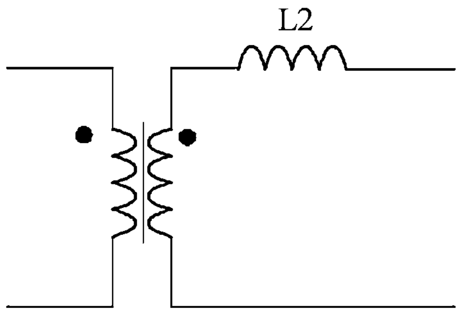
Figure 3C:
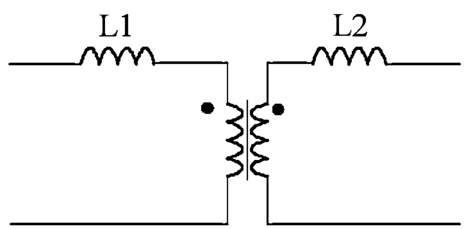

Output terminals of conversion branches 101 are cascaded, and two terminals of the cascaded conversion branches are connected to an input terminal of the secondary-side bridge arm 103 through the transformer 102. In practice, the transformer 102 may be a high-frequency double-winding transformer. In this case, the transformer 102 may include: an iron core, a primary-side winding and a secondary-side winding. The primary-side winding of the transformer 102 is connected to the two terminals of the cascaded conversion branches 101 through a first inductor L1 (as shown in FIG. 3*a*). Alternatively, a secondary-side winding of the transformer 102 is connected to an input terminal of the secondary-side bridge arm 103 through a second inductor L2 (as shown in FIG. 2 and FIG. 3*b*). Alternatively, the primary-side winding of the transformer 102 is connected to the two terminals of the cascaded conversion branches 101 through the first inductor L1, and the secondary-side winding of the transformer 102 is connected to the input terminal of the secondary-side bridge arm 103 through the second inductor L2 (as shown in FIG. 3*c*). In addition, the first inductor L1 and the second inductor L2 may be independent inductors, that is, being independently arranged at a side of the transformer 102. Alternatively, the second inductor L2 may be integrated in the transformer 102 in a form of a secondary-side leakage inductor, and the first inductor L1 may be integrated in the transformer 102 in a form of a primary-side leakage inductor, which depends on the specific application environment and fall within the protection scope of the present disclosure.

The output terminal of the secondary-side bridge arm 103 serves as an output terminal of the micro inverter.

It should be noted that the output terminal of the micro inverter may be connected to the power grid through an external filter. Alternatively, the micro inverter may be provided with a grid-side filter 104 arranged between the output terminal of the secondary-side bridge arm 103 and the output terminal of the micro inverter. The grid-side filter 104 may be an LC filter, but not limited to this, which is within the protection scope of the present disclosure.

Taking the structure of the micro inverter shown in FIG. 2 as an example, an operation principle of the micro inverter is described as follows.

Direct-current power from each direct-current power supply is converted to an alternating-current power through a single-stage conversion by a corresponding conversion branch 101. Alternating-current power from the output terminals of the cascaded conversion branches 101, that is, the alternating-current side, is inputted to the transformer 102 for voltage increasing and isolation, then a second inductor L2 at the secondary side changes the phase of the power of the secondary-side winding and transmits the power to the input terminal of the secondary-side bridge arm 103. The secondary-side bridge arm 103 adjusts the power to an alternating-current power for grid connection. In a case that each of the input terminal is connected to a load, the direction of the current is opposite, and the voltage of the transformer 102 at the primary side is shared among the cascaded conversion branches 101, and each of the conversion branch 101 performs power conversion to supply power to the corresponding load.

In the micro inverter according to this embodiment, each direct-current power supply or load can be connected to the alternating-current grid through only one-stage conversion by the corresponding conversion branch 101. Compared with the two-stage conversion structure in the conventional technology, the loss in the conversion process is reduced and the conversion efficiency is improved. Moreover, the N conversion branches 101 in the main circuit of the micro inverter are cascaded to share a same transformer 102 to output an alternating-current power. Compared with the solution in the conventional technology that requires N transformers, the quantity of transformers is reduced, so that the volume and system cost of the micro inverter are reduced. In addition, the conversion branches 101 share structural components such as the transformer 102, the secondary-side inductor L2 and the secondary-side bridge arm 103, improving the power density and reducing the cost per watt of the system.

It should be noted that, in a case of multiple inputs, another solution in the conventional technology is to adopt a multi-winding transformer to implement energy coupling to perform energy transmission. Therefore, once an input port is added, a primary-side winding is added to implement energy coupling, and it is required to provide an inductor for each primary-side winding, to implement decoupling among the multiple inputs. Furthermore, in the case of multiple inputs, the transformer still has a large volume, which is not convenient for expansion of multiple-input.

However, the micro inverter provided in the embodiment performs energy coupling by multiple cascaded conversion branches 101, and it is unnecessary to increase the quantity of the primary-side winding in the transformer 102 in a case that the quantity of input ports is increased. Moreover, the cascaded structure may further be used to implement the independent control of direct-current-side power of the conversion branches 101, that is, the power magnitude and current direction of each conversion branch 101 may be controlled independently, so that the decoupling among the multiple inputs can be implemented, avoiding the arrangement of an inductor for each of the multiple inputs in the conventional technology. Therefore, compared with the above solution with multiple primary-side windings, in this embodiment, the quantity of windings and inductors are reduced, thereby reducing the volume of the transformer, thus reducing the system cost.

Figure 4:
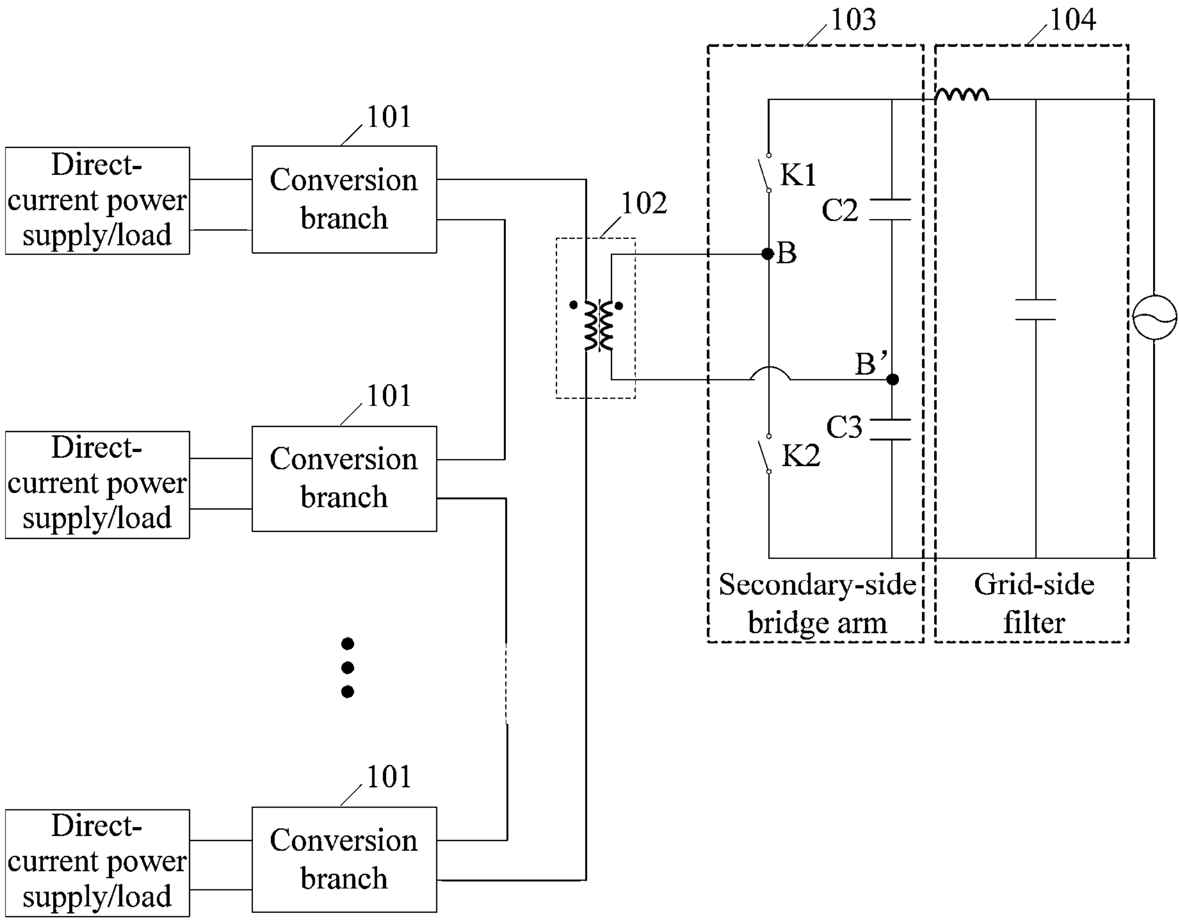
FIG. 4 is a schematic structural diagram of a micro inverter according to another embodiment of the present disclosure.

Based on the above embodiment, FIG. 4 shows an example of a topological structure of the micro-inverter.

A secondary-side bridge arm 103 includes: two bidirectional switches K1 and K2, and two output-side capacitors C2 and C3.

The two bidirectional switches K1 and K2 are connected in series to form a branch, the two output-side capacitors C2 and C3 are connected in series to form another branch, and the two branches are connected in parallel to two ends of the output terminal of the secondary-side bridge arm 103.

A connection point B between the two bidirectional switches K1 and K2, and a connection point B' between two output-side capacitors C2 and C3 respectively serve as two ends of the input terminal of the secondary-side bridge arm 103. FIG. 4 shows an example in which a leakage inductor is used, and an inductor independent of the transformer 102 is not shown in the drawings.

Figure 5:
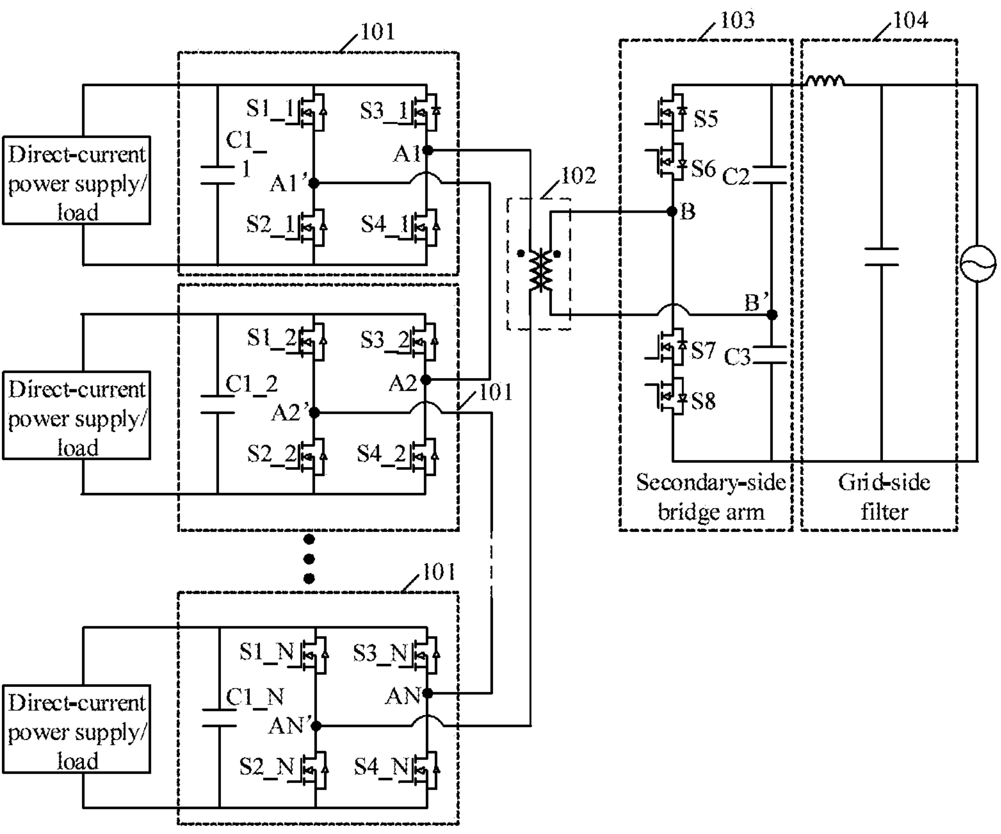
FIG. 5 is a circuit diagram of a micro inverter according to an embodiment of the present disclosure.

In an embodiment, each of the bidirectional switches K1 and K2 may include two switching transistors connected in reverse series. As shown in FIG. 5, the bidirectional switching transistor K1 includes two N-metal-oxide-semiconductor (NMOS) transistors S5 and S6 sharing a common source, and the bidirectional switch K2 includes two NMOS transistors S7 and S8 sharing a common source. In practice, two insulated gate bipolar transistors (IGBTs) sharing a common emitter may also be used to implement bidirectional switching, and each IGBT is provided with an anti-parallel diode. In practice, other switching transistors may be used to implement bidirectional switching, which is not limited herein, may be determined according to the application environment, and fall within the protection scope of the present disclosure.

As shown in FIG. 5, the conversion branch 101 includes: a H-bridge circuit (including S1_1, S2_1, S3_1 and S4_1, or S1_2, S2_2, S3_2 and S4_2, or S1_N, S2_N, S3_N and S4_N as shown in FIG. 5) and a input-side capacitor (C1_1, C1_2 or C1_N as shown in FIG. 5).

Two terminals of the input-side capacitor and the two ends of the H-bridge circuit at the direct-current side are connected to the two ends of the input terminal of the conversion branch 101. For example, in a first conversion branch 101, two terminals of the input-side capacitor C1_1 and two ends of the H-bridge circuit (including S1_1, S2_1, S3_1 and S4_1) at the direct-current side are connected to the two ends of the input terminal of the first conversion branch 101. In a second conversion branch 101, two terminals of the input-side capacitor C1_2 and the two ends of the H-bridge circuit (including S1_2, S2_2, S3_2 and S4_2) at the direct-current side are connected to the two ends of the input terminal of the second conversion branch 101. In an N-th conversion branch 101, two terminals of the input-side capacitor C1_N and the two ends of the H-bridge circuit (including S1_N, S2_N, S3_N and S4_N) at the direct-current side are connected to the two ends of the input terminal of the N-th conversion branch 101.

The two terminals (A1 and A1', or A2 and A2', or AN and AN' shown in FIG. 5) of the H-bridge circuit at the alternating-current side serve as two ends of output terminal of the conversion branch 101.

That is, the primary side of transformer 102 can be connected to multiple direct-current power supplies or loads through the cascaded N H-bridge circuits, and secondary-side bridge arm 103 adopts the bidirectional switch to implement a grid connection.

Figure 6:
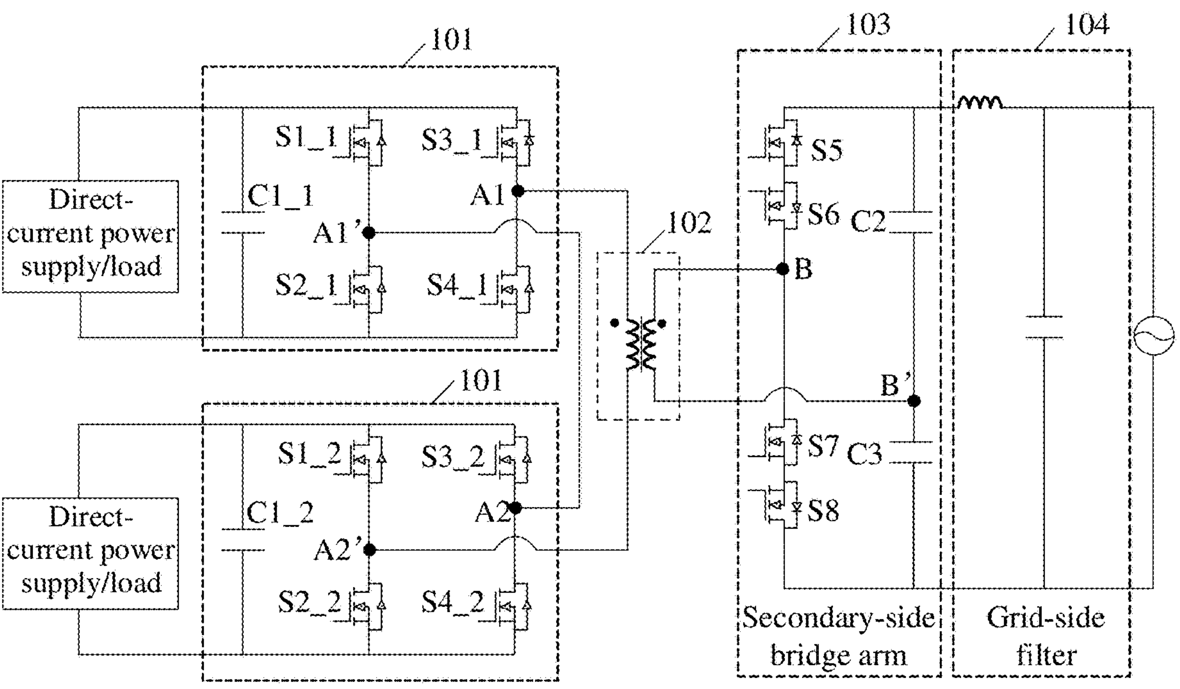
FIG. 6 is a circuit diagram of a micro inverter in a case of N=2 according to an embodiment of the present disclosure.

In a case of N=2, the solution of one-drive-two structure is implemented. FIG. 6 shows a topological structure of a micro inverter with a single-stage conversion and two-input.

A main circuit of the micro inverter adopts a dual active bridge (DAB) and a bidirectional switch, and implements a conversion between the direct-current power and alternating-current power through single-stage conversion, which improves the efficiency of grid connection.

Taking photovoltaic modules as an example, a direct-current power is inputted from a first photovoltaic module, where a direct-current voltage is converted into a pulsating voltage through the high-frequency switches (including S1_1, S2_1, S3_1 and S4_1) of the H-bridge circuit, and a same conversion process is performed on the direct-current power inputted from a second photovoltaic module. Then, as output terminals of the two alternating-current pulsating voltages of the H-bridge circuit are cascaded, the two alternating-current pulsating voltages are inputted to the primary-side winding of the high-frequency dual-winding transformer 102.

Figure 7:
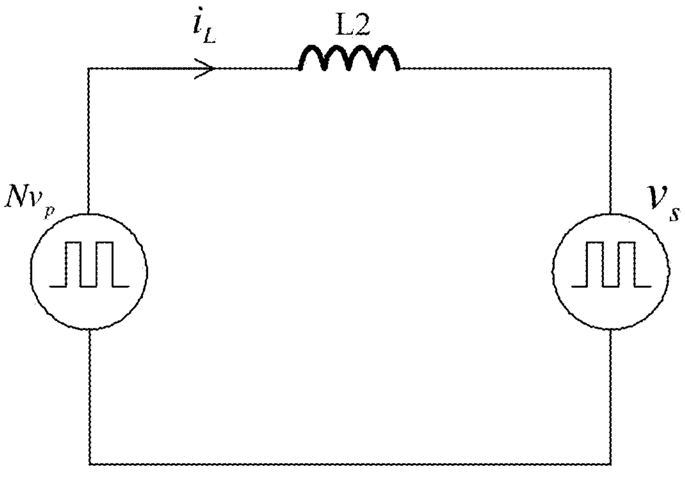
FIG. 7 is a schematic diagram of a simplified topological structure of a micro inverter according to an embodiment of the present disclosure.

Assume that the primary-side voltage of the transformer 102 is $v_p$, the voltage between the two ends B and B' of the input terminal of the secondary-side bridge arm 103 is $v_s$, the current of the secondary-side leakage inductor L2 is $i_L$, and a voltage conversion ratio between the primary side and secondary side of the transformer 102 is 1:N, a secondary-side voltage converted from the primary-side voltage is $Nv_p$. A simplified topological structure of the micro inverter is shown in FIG. 7. Therefore, power may be transmitted based on a phase difference between voltages across the secondary-side leakage inductor L2.

Figure 8:
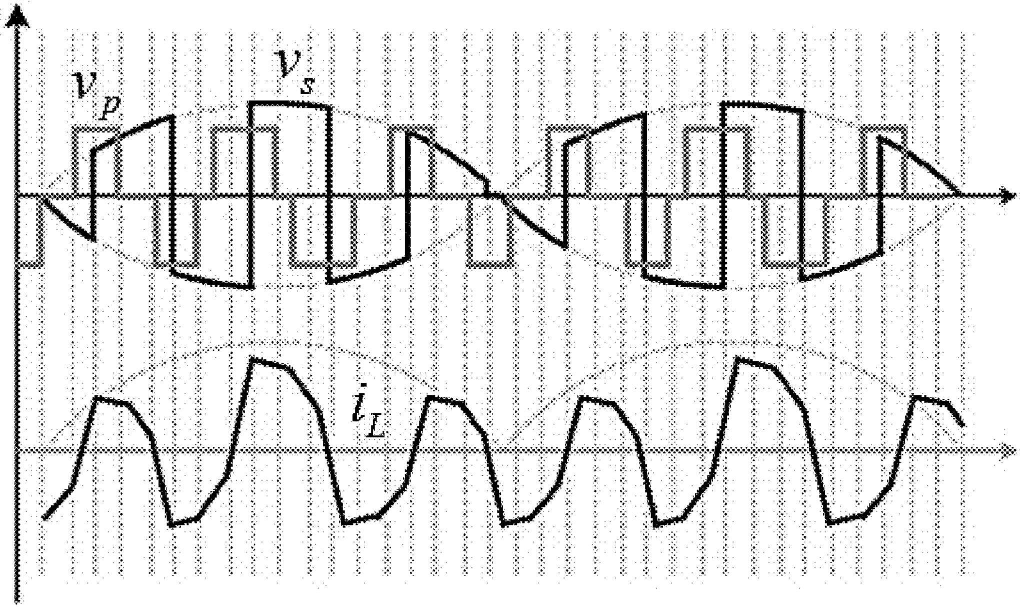
FIG. 8 is a waveform diagram of signals of a micro inverter according to an embodiment of the present disclosure.

During a positive half-cycle of the grid voltage, the switching transistors S5 and S7 of the secondary-side leg 103 performs high-frequency chopping, the switching transistors S6 and S8 are turned on; and during a negative half-cycle of the grid voltage, the switching transistors S5 and S7 in the secondary-side bridge arm 103 are turned on, the switching transistors S6 and S8 performs high-frequency chopping, so that the secondary-side bridge arm 103 converts the output voltage into a pulsating voltage with the grid voltage as an envelope to implement grid connection. The waveform of the signals is as shown in FIG. 8.

That is, in a case of N=2, the single-stage structure shown in FIG. 6 may be adopted to improve the efficiency of grid connection of the system. Moreover, with the one-drive-two solution, the structural component is shared, reducing the cost per watt of the system.

It should be noted that the cascaded structure implements decoupling among the conversion branches 101. Therefore, the multiple input terminals may be connected to different devices. In a case that the input terminal of the conversion branch 101 is connected to a direct-current power supply, which includes an energy storage device operating in a discharge mode, the control unit controls a phase-shift angle between the H-bridge circuit and the secondary-side bridge arm 103 to be greater than zero, that is, the phase of the H-bridge circuit is ahead of the phase of the secondary-side bridge arm 103, so that the power is transmitted from the direct-current side to the alternating-current side; and in a case that the input terminal of the conversion branch 101 is connected to a load, which includes a device operating in a charge mode, the control unit controls the phase-shift angle between the H-bridge circuit of the conversion branch 101 and the secondary-side bridge arm 103 to be less than zero, that is, the phase of the H-bridge circuit lags the phase of the secondary-side bridge arm 103, so that the power is transmitted from the alternating-current side to the direct-current side.

The H-bridge circuits may be controlled independently from each other. An equivalent switching frequency in each of the H-bridge circuits may be a double-frequency, which can implement multiple levels. The direct-current side powers of the H-bridge circuits may be controlled independently from each other by independently controlling power magnitude and current direction.

Further, in a case that an input terminal of a conversion branch 101 is connected with no device, the control unit controls the two ends of the output terminal of the conversion branch 101 to be short-circuited. Specifically, the control unit may control at least two of the four switching transistors in the H-bridge circuit to be turned on, e.g. controlling the upper bridge arm of the H-bridge circuit to be turned on and the lower bridge arm of the H-bridge circuit to be turned off, or controlling the lower bridge arm to be turned on and the upper bridge arm to be turned off. In addition, the control unit may control three of the switching transistors or all of the switching transistors to be turned on.

Similarly, the single-stage dual-input micro inverter shown in FIG. 6 is taken as an example. In a case that one of the two connected photovoltaic modules is shielded, or one conversion branch 101 is connected with no device, the switching transistors of the H-bridge circuit at the primary side in the conversion branch 101 needs to be adjusted accordingly in order to enable the other conversion branch to operate normally. For example, in a case that a second branch is connected with no device or the photovoltaic module connected thereto is completely shielded, it is required to turn on S1_2 and S3_2 in the second H-bridge circuit, and turn on or turn off S2_2 and S4_2; or turn on S2_2 and S4_2, and turn on or turn off S1_2 and S3_2, so as to control two ends of the output terminal of the second H-bridge circuit to be short-circuited. Further, power transmission is controlled by controlling the phase-shift angle between the first H-bridge circuit at the primary side and the secondary-side bridge arm 103.

In a case that N equals to another value, reference may be made to the above solution. Further, in an embodiment, in a case that one conversion branch 101 is connected with no device, another conversion branch 101 can operate normally by controlling the switching transistors of the H-bridge circuit at the input side in the conversion branch 101 that is connected with no device, thereby eliminating the effect of the input side of the conversion branch 101 that is connected with no device on the system, thus improving the reliability of the system.

Furthermore, for the micro inverter provided in this embodiment, the voltage level is low. For example, a voltage of secondary-side bridge arm 103 may be 220V, and an input voltage of each H-bridge circuit at the primary side may be 100V. In addition, the power level of the micro inverter is also low, which is suitable for the occasions with a low voltage level and a low power level.

In practice, in addition to the main circuit and the control unit, the micro inverter is further be provided with a collecting module to collect a grid voltage, a grid-connected current and the input voltage and input current of each of the conversion branches.

The embodiments in the present disclosure are described in a progressive manner. The same and similar parts among the embodiments may be referred to each other. Each of the embodiments focuses on differences from the other embodiments. Particularly, the system or system embodiments are essentially similar to the method embodiments, and therefore are described in brief. Reference may be made to the description of the method embodiments for relevant details. The above-described system and the system embodiments are only schematic. A unit described as a discrete component may or may not be physically separated. Components shown as units may or may not be physical units, that is, the components may be located in one place or may be distributed onto multiple network units. Some or all modules thereof may be selected based on an actual requirement, to implement an objective of the solution in the embodiments. Those skilled in the art may understand and implement the present disclosure without any creative effort.

Those skilled in the art should further be noted that, exemplary units and algorithm steps described in conjunction with the embodiments disclosed herein may be implemented by electronic hardware, computer software or a combination thereof. In order to clearly illustrate interchangeability of the hardware and the software, the units and steps in the embodiments are described generally in terms of functions in the above description. Whether these functions are performed in hardware or software depends on the specific application and design constraints for the technical solution. Those skilled in the art may use different methods for each particular application to implement the described functions, but such implementation should not be considered as going beyond the scope of the present disclosure.

Based on the above description of the disclosed embodiments, features described in the embodiments in the present disclosure may be replaced or combined so that those skilled in the art can implement or use the present disclosure. Various modifications to the embodiments are apparent for the skilled in the art. The general principles defined herein may be implemented in other embodiments without departing from the spirit and scope of the present disclosure. Therefore, the present disclosure should not be limited to the embodiments disclosed herein, but has the widest scope in accordance to the principle and the novel features disclosed herein.

The invention claimed is:

1. A micro inverter, comprising: a control unit, a transformer, a secondary-side bridge arm and N conversion branches, where Nis an integer greater than one; wherein an input terminal of each of the conversion branches serves as power-supply input terminal or a load terminal of the micro inverter;

output terminals of the conversion branches are cascaded, and two terminals of the cascaded conversion branches are connected to an input terminal of the secondary-side bridge arm through the transformer;

an output terminal of the secondary-side bridge arm serves as an output terminal of the micro inverter; and the secondary-side bridge arm and the conversion branches are controlled via the control unit;

wherein a primary-side winding of the transformer is connected to the two terminals of the cascaded conversion branches through a first inductor; and/or a secondary-side winding of the transformer is connected to the input terminal of the secondary-side bridge arm through a second inductor;

wherein the first inductor is independent of the primary-side winding, or the first inductor is a primary-side leakage inductor integrated in the transformer; and the second inductor is independent of the secondary-side winding, or the second inductor is a secondary-side leakage inductor integrated in the transformer.

2. The micro inverter according to claim 1, wherein the transformer is a high-frequency dual-winding transformer.

3. The micro inverter according to claim 1, wherein the secondary-side bridge arm comprises two bidirectional switches and two output-side capacitors;

the two bidirectional switches are connected in series to form a branch, the two output-side capacitors are connected in series to form another branch, and the two branches are connected in parallel to two ports of the output terminal of the secondary-side bridge arm; and a connection point between the two bidirectional switches, and a connection point between the two output-side capacitors respectively serve as two ports of the input terminal of the secondary-side bridge arm.

4. The micro inverter according to claim 3, wherein each of the bidirectional switches comprises two switching transistors connected in reverse series.

5. The micro inverter according to claim 1, wherein each of the conversion branches comprises an H-bridge circuit and an input-side capacitor;

two terminals of the input-side capacitor and two ports of the H-bridge circuit at a direct-current side are connected to the two ports of the input terminal of the conversion branch; and the two terminals of the H-bridge circuit at an alternating-current side serve as two ports of the output terminal of the conversion branch.

6. The micro inverter according to claim 5, wherein the control unit is configured to independently control the H-bridge circuits.

7. The micro inverter according to claim 6, wherein in a case that a phase-shift angle between the H-bridge circuit and the secondary-side bridge arm is greater than zero, power in the H-bridge circuit is transmitted from the direct-current side to the alternating-current side; and in a case that the phase-shift angle between the H-bridge circuit and the secondary-side bridge arm is less than zero, the power in the H-bridge circuit is transmitted from the alternating-current side to the direct-current side.

8. The micro inverter according to claim 6, wherein in a case that an input terminal of one of the N conversion branches is unconnected, the control unit is configured to control two ports of the output terminal of the conversion branch to be short-circuited.

9. The micro inverter according to claim 8, wherein in order to control the two ports of the output terminal of the conversion branch to be short-circuited, the control unit is further configured to control at least two of four switching transistors in the H-bridge circuit to be turned on.

10. The micro inverter according to claim 1, wherein each of input terminals of the micro inverter is connected to a photovoltaic module or an energy storage device.

11. The micro inverter according to claim 1, further comprising a grid-side filter, connected to the output terminal of the secondary-side bridge arm.

* * * * *